Nov. 18, 1941.　　A. C. EVERETT　　2,262,799
CONTAINER FEEDING DEVICE
Filed June 14, 1940　　2 Sheets-Sheet 1
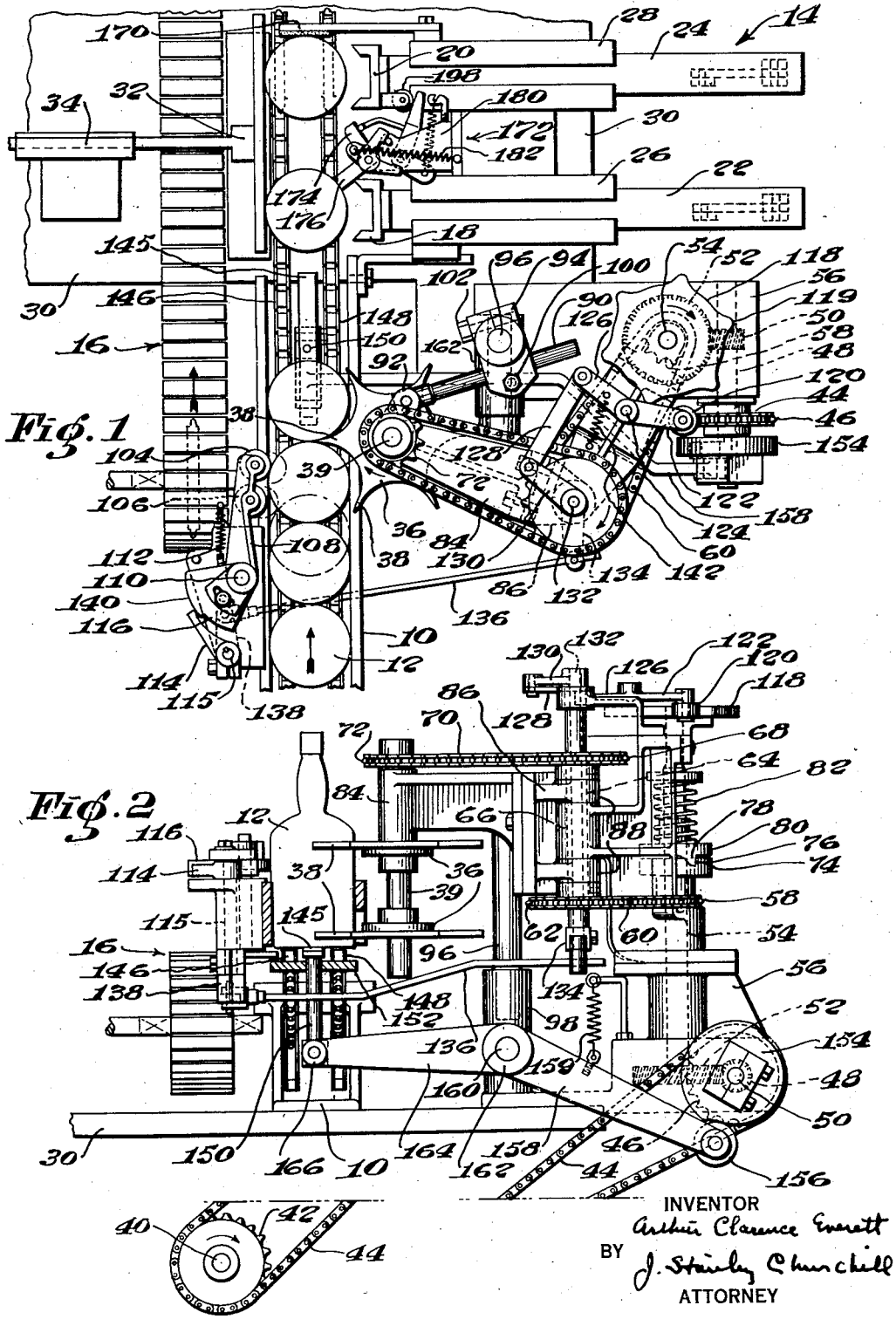

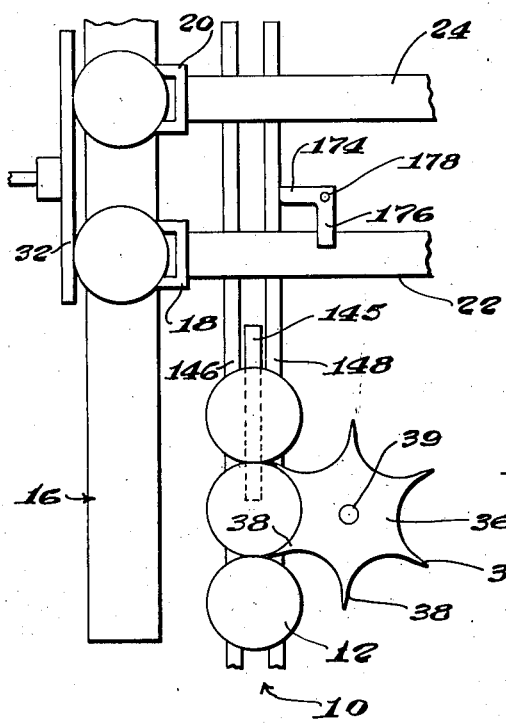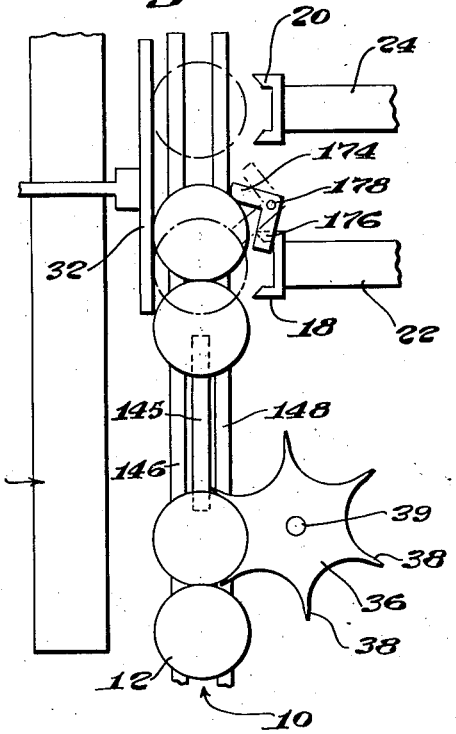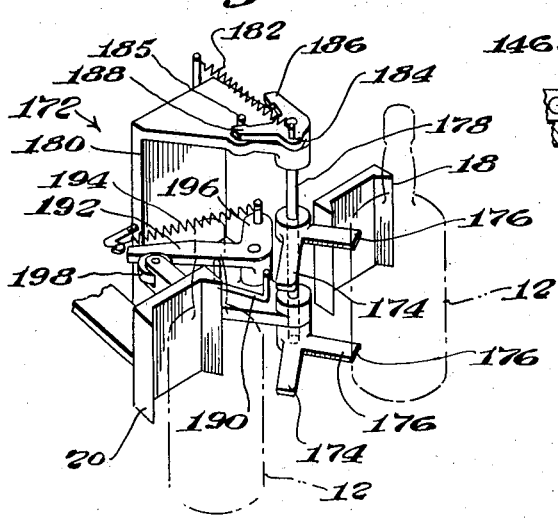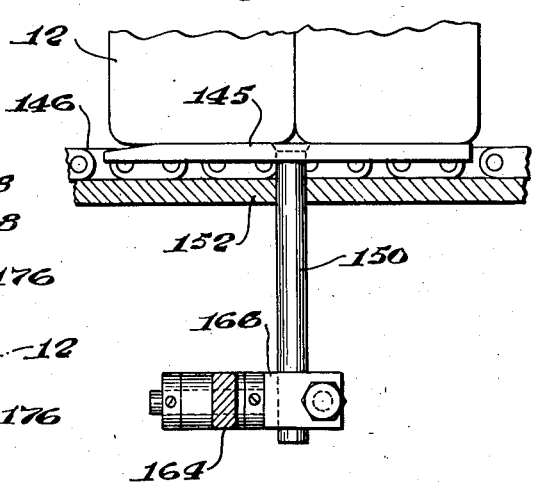

Patented Nov. 18, 1941

2,262,799

UNITED STATES PATENT OFFICE 2,262,799

CONTAINER FEEDING DEVICE

Arthur Clarence Everett, Boston, Mass., assignor to Pneumatic Scale Corporation, Limited, Quincy, Mass., a corporation of Massachusetts Application June 14, 1940, Serial No. 340,529

11 Claims. (Cl. 198—24)

This invention relates to a container feeding device.

The invention has for an object to provide a novel and improved container feeding device arranged to transfer containers in spaced relation from a supply conveyer to a second conveyer in order to position the containers on said second conveyer in spaced relation for registration with mechanism adapted for subsequent operation upon the containers.

Another object of the invention is to provide a simple and efficient container feeding device for transferring containers in spaced relation from a supply conveyer to a second conveyer in which provision is made for controlling the feed of a line of containers being conveyed in contiguous engagement upon the supply conveyer in a manner such as to release them in timed relation to the operation of the transferring mechanism, and in which provision is also made for registering the containers thus released in spaced relation and in operative position with said transferring mechanism.

With these general objects in view, and such others as may hereinafter appear, the invention consists in the container feeding and transferring device and in the various structures, arrangements and combinations of parts hereinafter described and particularly defined in the claims at the end of this specification.

In the drawings illustrating the preferred embodiment of the invention, Fig. 1 is a plan view of a container feeding and transferring device embodying the present invention; Fig. 2 is a side elevation of the device shown in Fig. 1; Figs. 3 and 4 are plan views diagrammatically illustrating the movement and relative positions of the containers during the operation of the device, to be referred to; Fig. 5 is a detail view in perspective of the container separating mechanism for positioning the containers in front of their respective pushers; and Fig. 6 is a detail view showing a portion of the bottle elevating mechanism to be referred to.

The present invention preferably contemplates the provision of a novel and efficient device for controlling the feed of a line of containers disposed in contiguous engagement upon a continuously moving supply conveyer whereby to release the containers in timed relation to the operation of a transferring device adapted to transfer a plurality of containers in definite spaced relation from the supply conveyer to a second conveyer. The transferring device is arranged to be operated in timed relation to the operation of said second conveyer and to dispose the containers thereupon in spaced relation for registration with mechanisms for performing subsequent operations upon the containers. The second conveyer may and preferably will be an intermittently operated belt adapted to convey the spaced containers to intermittently operated mechanisms for operation upon the containers. By way of example, the second belt may form a part of and operate in timed relation to a labeling machine of any usual form now upon the market and in which provision is made for intermittently feeding the articles to be labeled in a definite path with relation to reciprocatory mechanisms for applying a label and for wiping the label into intimate contact with the article. Reference is made to the United States patent to C. S. Weeks, No. 1,425,351, August 8, 1922, which discloses the details of construction and mode of operation of such a labeling machine. The labeling machine illustrated in the Weeks patent was provided with reciprocatory mechanisms for operation upon a single article at a time and, as shown in such patent, provision was made for feeding successive articles to be labeled in timed relation to the operating devices. The commercial labeling machines, now being manufactured and sold, are in some instances, provided with multiple reciprocating units for simultaneous operation upon at least two articles at a time to thereby increase the productive capacity of the machine. In addition, duplicate units are provided upon either side of the conveyer for operating simultaneously upon both sides of the articles.

In the illustrated and preferred embodiment of the invention, the feed control device may include a continuously rotated star wheel arranged to hold up the progress of the contiguous line of containers upon the supply conveyer and to release the containers individually to permit them to be advanced to a position in front of the transferring device. In the illustrated embodiment of the invention, the transferring device comprises two pushers arranged in spaced relation so that the star wheel is timed to release two containers each cycle of operation. In operation, the pushers are arranged to transfer the containers during one-half cycle of operation and are disposed in their retracted position during the remaining half cycle. In accordance with the present invention, provision is made for delaying the first container of each pair released by the star wheel to prevent it from being advanced to the transferring mechanism until after the latter has been returned to its retracted position and the second container of the pair to be advanced is released, whereupon both containers are advanced to the transferring mechanism. Provision is also made for separating or aligning the pair of containers thus released in order to stop them in operative position in front of their respective pushers after they have been released, as will be hereinafter described.

Referring now to the drawings, which illustrate the preferred embodiment of the invention, the container feeding and transferring apparatus may include a continuously moving supply conveyer 10 upon which the incoming containers 12, herein shown as bottles, are moved in contiguous relation and a transferring mechanism indicated generally at 14, arranged to transfer successive containers two at a time and in spaced relation onto an intermittently operated conveyer belt 16 which may and preferably will form a part of and be operated in timed relation to a multiple unit labeling machine of the character above referred to. In practice, the intermittently operated conveyer may and preferably will be operated so as to be in motion during one half of a cycle of operation of the labeling machine and at rest during the remaining one-half cycle, and the transferring operation is preferably performed during the half cycle when the intermittently operated conveyer is at rest. As herein shown, the transferring mechanism includes a pair of pushers 18, 20 mounted for reciprocation with slide bars 22, 24 slidingly mounted in guide brackets 26, 28, secured to the machine frame 30. The slide bars may be reciprocated through any usual or preferred connections, not shown, from the labeling machine and in timed relation thereto, whereby to transfer two containers which have been positioned in proper spaced relation in front of the pushers from the supply conveyer 10 onto the intermittently operated conveyer 16 during the idle period of the latter. Provision is also made for supporting the opposite sides of the containers during the transferring operation, and as herein shown, a cooperating reciprocable transfer member 32 mounted to slide in a bracket 34 is arranged to be operated in timed relation to the pushers 18, 20 during the transferring operation through any preferred mechanism, not shown.

In accordance with the present invention, provision is made for controlling the feed of the containers being delivered on the continuously moving supply conveyer in timed relation to the operation of the transferring mechanism in order to deliver two containers to the pushers 18, 20 during each cycle of operation. As herein shown, the feed controlling mechanism includes a star wheel 36 comprising upper and lower members arranged to engage the container at different heights and provided with equally spaced teeth or arms 38 adapted to enter between successive containers as they are delivered thereto and provision is made for rotating the star wheel continuously at a rate of speed such as to permit two containers to be released during each cycle of operation. As illustrated in Figs. 1 and 2, the star wheel is mounted upon a vertical shaft 39 arranged to be driven continuously through connections from a driving shaft 40, forming a part of the labeling machine, and including a sprocket 42 connected by a chain 44 to a sprocket 46 fast on a short shaft 48 supported in a bracket 56 attached to the machine frame. The short shaft 48 is provided with a spiral gear 50 which meshes with a spiral gear 52 fast on the lower end of a vertical shaft 54 which latter is journaled in the supporting bracket 56. The vertical shaft 54 is provided with a sprocket 58 connected by a chain 60 to a sprocket 62 fast upon the lower end of a vertically mounted hollow shaft 64 which is arranged to rotate in a bearing member 66 forming a part of the bracket 56. The upper end of the hollow shaft 64 is provided with a sprocket 68 fast thereon which is connected by a chain 70 to a sprocket 72 secured to the top of the star wheel shaft 39. The sprocket 58, as herein shown, is loosely mounted upon the vertical shaft 54 and forms part of a separable driving mechanism normally engaged but which is constructed and arranged to slip out of operative engagement in the event that the star wheel should encounter abnormal resistance such as would occur if one of the arms 38 should engage the middle of a container. As herein illustrated, see Fig. 2, the sprocket 58 is provided with a flanged portion 74 having a notch 76 which is adapted to be engaged by a raised portion 78 provided on a disk 80 rotatable with but vertically slidable upon the shaft 54. A coil spring 82 normally holds the disk 80 in operative engagement to drive the sprocket 58 but if a jam occurs between the teeth of the star wheel and a container, the raised portion 78 will slip out of the notch 76 and raise the disk 80 against the resistance of the spring 82.

In the preferred embodiment of the invention provision is made for adjusting the star wheel unit toward and from the side of the conveyer in order to dispose the rotatable members 36 in proper relation to the containers for registration therewith as they pass thereby, and to enable containers of different sizes and shapes to be used with a corresponding size and shape of star wheel. As herein shown, the star wheel shaft 39 is rotatably mounted in a bearing member 84 which is attached to a hinged bracket 86 having arms 88 embracing the bearing member 66 and which is rockingly mounted upon the hollow shaft 64 to enable the unit to be swung toward and from the conveyer. The unit is arranged to be retained in its adjusted position by connections to the bearing member 84 including a link 90 pivotally connected to a lug 92 extending from the bearing. The link 90 is slidingly received in a clamp 94 which is mounted on a vertical stud 96 extending from a boss 98 forming part of the bracket 56. When it is desired to adjust the position of the unit, the clamp nuts 100, 102, are loosened and the link 90 is extended or retracted as required whereupon the clamp is tightened in its adjusted position.

From the description thus far, it will be observed that under normal operating conditions successive containers being delivered by the supply conveyer 10 in contiguous engagement will be received between the arms 38 of the star wheel, and in operation, the supply conveyer 10 is arranged to travel faster than the star wheel, so that the latter will have the effect of holding back the line of containers and of controlling the feed thereof to the transferring mechanism. However, should the supply of containers be interrupted so that there is a space between the containers being delivered on the supply conveyer, such containers might be received out of time with the star wheel so that one of the arms 38 would engage the side of the bottle instead of passing between successive bottles. In order to avoid this condition, provision is made in the preferred embodiment of the invention for registering the containers between the teeth of the star wheel so that in the event a container arrives at the star wheel out of time with the latter, such container will be held back and not permitted to enter until the star wheel has rotated a sufficient distance to allow the container to register between adjacent teeth. As herein shown, a pair of rollers 104, 106 carried by an arm 108, pivotally mounted upon a stud 110, are arranged to engage the containers as they pass by. Normally, while the containers are delivered continuously and in timed relation, the rollers are held out in the position shown in full lines in Fig. 1. However, if the containers are not fed regularly or if there should be a space between successive containers, the roller arm 108 will be rocked by a spring 112, into the path of the oncoming container as shown in dotted lines in Fig. 1. Provision is made for locking the roller arm in its rocked position until the star wheel is in position to receive the container, and as herein illustrated, the locking mechanism may comprise a latch arm 114 secured to a short vertical shaft 115 and arranged to engage a latch member 116 extending from the roller arm 108 when the latter is rocked forwardly in the absence of a container.

The latch arm 114 is arranged to be withdrawn from engagement with the latch member 116 in timed relation to the movement of the star wheel 36 in order to release a container at the proper time to be received between the teeth 38. As herein shown, the withdrawal of the latch arm 114 is accomplished through connections from a cam 118 fast upon the top of the vertical shaft 54. The cam 118 cooperates with a cam roller 120 carried by one arm 122 of a bell crank pivotally mounted on a stud 124. The second arm 126 of the bell crank is connected by a link 128 to an arm 130 secured to the top of a vertical shaft 132 rotatably mounted in the hollow vertical shaft 64 as shown in Fig. 2. The lower end of the vertical shaft 64 is provided with a lever 134 fast thereon which is connected by a link 136 to an arm 138 fast upon the lower end of the short vertical shaft 115 upon which the latch arm 114 is mounted. It will be observed that the cam 118 is provided with a plurality of raised portions 119, equal in number to the teeth 38 of the star wheel and the relation of the parts is such that the latch arm 114 is rocked each time a tooth 38 arrives in position to receive a container. It will be understood that during normal operating conditions, as when the containers are being continuously delivered in timed relation to be received by the star wheel, the roller arm 108 is held back by the engagement of the rollers with the containers so that the latch arm 114 will not engage the notch in the latch member 116 during such time, but may rest against the curved surface 140 until such time as the roll arm is moved inwardly whereupon the latch arm will drop into the notched portion of the latch member. A spring 142 holds the linkage in operative position to urge the latch into the notch and to hold the roller 120 against its cam 118, but normally when in the position shown in Fig. 1, with the latch arm 114, bearing against the curved surface 140, the roller 120 is held away from the cam, as illustrated, but in position to be engaged by the high spots 119 of the cam. Although the member 114 is rocked by the cam each time a container is due to arrive, such rocking is effective to release the container in timed relation only when a container is late in arriving or is received out of time with the rotation of the star wheel. Thus, a container is prevented from being advanced into a position such that a tooth might jam against the side of a container.

In the operation of the machine, as described thus far, it will be observed that the containers 12 are released individually from between the arms 38 of the star wheel as the latter is rotated in timed relation to the operation of the transferring mechanism so as to release two containers during each cycle of operation. However, since as above described, the transferring mechanism is in its retracted position during only approximately one half of a cycle of operation, provision is made for delaying the first container of the pair released each cycle so that two containers are advanced into operative position in front of the pushers at once during the retracted period. As herein illustrated, see Figs. 2 and 6, the delaying mechanism may comprise an elevating rail 145 disposed between the chains 146, 148 of the conveyer 10 and arranged to lift the first container off the chains and to hold it in such raised position until the second container is released by the star wheel and the transferring mechanism is in its retracted position. The elevating rail is mounted on top of a vertical rod 150 slidingly mounted in a supporting bar 152 and is arranged to be raised and lowered in timed relation to the operation of the pushers 18, 20 by a cam 154 fast upon the shaft 48. A roller 156 arranged to cooperate with the cam is carried by one arm 158 of a two armed lever rockingly mounted upon a stud 160 fast in a hub 162 extending from the boss 98. The other arm 164 of the two-armed lever is connected to the rod 150 by a swivelled clamp member 166 as shown in Fig. 6. A spring 159 operates to hold the roller 156 against its cam 154.

In operation, the first container of the pair to be released during one cycle of operation is released during the time when the pushers 18, 20 are in motion and this first bottle is engaged by the elevating bar and raised off the conveyer chains to retard its forward motion. During the time when the pushers are being retracted, the second container of the pair is being moved along by the star wheel and during this time, the second container will operate to push the first one along the elevating bar so that by the time the pushers are fully retracted, the elevating bar is lowered, whereupon both containers are advanced at once toward the transferring mechanism. This relative movement of the various parts is diagrammatically illustrated in Figs. 3 and 4.

As illustrated in Figs. 1 and 5, provision is made for separating and stopping the pair of containers thus released to present them in spaced relation in front of their respective pushers 18, 20. The first container is arranged to pass by one pusher 18 and come to rest against a padded stop bar 170 in front of the other pusher 20. However, during its travel the first container is arranged to engage an escapement device indicated generally at 172 and to move the device into a position to stop the second container in front of its pusher 18. As herein shown, the escapement device comprises a pair of two-armed levers, each having arms 174, 176 arranged to engage the upper and lower portions of the containers. The two-armed levers are secured to a vertical rod 178 pivotally mounted in a supporting bracket 180 attached to a stationary part of the machine. The arms 174, 176 are arranged substantially at right angles to each other, and in operation when in readiness to receive a pair of containers, the arms are in the position shown in Fig. 3 so that the first container being advanced will engage the arms 174, see Fig. 4, to present the arms 176 in an angular position substantially 90 degrees from its starting position, as shown in Fig. 1 so that the second container will engage the ends of the arms 176 and be stopped thereby.

A spring 182 is connected to a lever 184 secured to the rod 178 and the spring is mounted in a manner such as to pass over dead center each time the arms are moved, whereby to hold them in their moved position upon either side of the pivot 178. Stop arms 186, 188 forming part of the lever 184 are arranged to engage a stationary pin 185 in the bracket 180 to limit the movement of the arms 174, 176 in either direction.

Provision is made for setting the escapement device each time the pushers are operated so as to be in readiness for the next pair of containers advanced during the following cycle of operation, and as herein illustrated, a resetting pin 190 extending from one arm 192 of a bell crank is arranged to engage one arm 174 and to rock it around to the position shown in Fig. 3 after the pushers 18, 20 are started on their transferring cycle of operation. A spring 194 connected to a second arm 196 of the bell crank normally urges the pin 190 in a resetting direction. Provision is made for rocking the bell crank to move the resetting pin 190 away from the arms 174 and to render the resetting mechanism inactive during the container receiving period when the pushers are retracted and as herein shown, the pusher member 20 is provided with a roller 198 which is arranged to engage the arm 192 during its retracting stroke and to hold the resetting mechanism in its inoperative position during the retracted period. In operation, as soon as the pushers 18, 20 are started forward, the spring 194 is released to enable the mechanism to rock the pin 190 around to perform the resetting operation.

From the above description it will be observed that the present container feeding and transferring device is enabled to control the feed of the containers in a smooth and continuous manner so as to avoid any sharp impact of the containers with the transferring mechanism, and to deposit the containers in spaced relation upon a second conveyer in a simple and efficient manner.

While the preferred embodiment of the invention has been herein illustrated and described, it will be understood that the invention may be embodied in other forms within the scope of the following claims.

Having thus described the invention, what is claimed is:

1. In a container feeding device of the character described, in combination, a continuously driven supply conveyer adapted to support and convey a line of the containers in contiguous relation, an intermittently driven second conveyer disposed in parallel relation to said supply conveyer for supporting and delivering containers transferred thereon from said supply conveyer, a transferring device adapted to transfer containers in spaced relation from the supply conveyer to said second conveyer, timing mechanism constructed and arranged to release successive containers from said line in timed relation to the operation of said transferring device, and means carried by said transferring device for separating the contiguous containers thus released.

2. In a container feeding device of the character described, in combination, a continuously driven supply conveyer adapted to support and convey a line of the containers in contiguous relation, an intermittently driven second conveyer disposed in parallel relation to said supply conveyer for supporting and delivering containers transferred thereon from said supply conveyer, a transferring device adapted to transfer containers in spaced relation from the supply conveyer to said second conveyer, a star wheel arranged to engage successive contiguous containers in the line and to release them in timed relation to the operation of said transferring device, and means carried by said transferring device for separating the contiguous containers thus released.

3. In a container feeding device of the character described, in combination, a continuously driven supply conveyer adapted to support and convey a line of the containers in contiguous relation, an intermittently driven second conveyer disposed in parallel relation to said supply conveyer for supporting and delivering containers transferred thereon from said supply conveyer, a multiple transferring device comprising a plurality of simultaneously operated pushers arranged in spaced relation and adapted to transfer the containers from the supply conveyer to said second conveyer, means for releasing a number of containers from said line corresponding to the number of pushers during each cycle of operation, and means carried by said transferring device for separating the contiguous containers thus released.

4. In a container feeding device of the character described, in combination, a continuously driven supply conveyer adapted to support and convey a line of the containers in contiguous relation, an intermittently driven second conveyer disposed in parallel relation to said supply conveyer for supporting and delivering containers transferred thereon from said supply conveyer, a multiple transferring device comprising a plurality of simultaneously operated pushers arranged in spaced relation and adapted to transfer the containers from the supply conveyer to said second conveyer, means for releasing a number of containers from said line corresponding to the number of pushers during each cycle of operation, and means carried by said transferring device for registering the containers thus released with respect to their respective pushers.

5. In a container feeding device of the character described, in combination, a continuously driven supply conveyer adapted to support and convey a line of the containers in contiguous relation, an intermittently driven second conveyer disposed in parallel relation to said supply conveyer for supporting and delivering containers transferred thereon from said supply conveyer, transferring mechanism adapted to transfer a plurality of containers from the supply conveyer to said second conveyer, said transfer mechanism being timed to be in its retracted position during the moving period of said intermittently driven second conveyer and being operative to transfer the containers during the idle period in the operation of said second conveyer, timing mechanism constructed and arranged to release a plurality of containers from said line corresponding to the number to be transferred during each cycle of operation, and means carried by said transferring device for separating the contiguous containers thus released.

6. In a container feeding device of the character described, in combination, a continuously driven supply conveyer adapted to support and convey a line of the containers in contiguous relation, an intermittently driven second conveyer for supporting and delivering containers transferred thereon from said supply conveyer, transferring mechanism adapted to transfer a plurality of containers from the supply conveyer to said second conveyer, said transfer mechanism being timed to be in its retracted position during the moving period of said intermittently driven second conveyer and being operative to transfer the containers during the idle period in the operation of said second conveyer, a star wheel arranged to engage successive containers being conveyed by said supply conveyer and to release a plurality thereof corresponding to the number to be transferred during each cycle of operation, and means for delaying the advance of the containers thus released to the transferring mechanism until the latter has been moved to its retracted position.

7. In a container feeding device of the character described, in combination, a continuously driven supply conveyer adapted to support and convey a line of containers in contiguous relation, an intermittently driven second conveyer for supporting and delivering containers transferred thereon from said supply conveyer, transferring mechanism adapted to transfer a plurality of containers from the supply conveyer to said second conveyer, said transfer mechanism being timed to be in its retracted position during the moving period of said intermittently driven second conveyer and being operative to transfer the containers during the idle period in the operation of said second conveyer, a star wheel arranged to engage successive containers being conveyed by said supply conveyer and to release a plurality thereof corresponding to the number to be transferred during each cycle of operation, and means for delaying the advance of the containers thus released to the transferring mechanism until the latter has been moved to its retracted position, said last named means comprising an elevating platform arranged to lift the released containers off the continuously moving supply conveyer and to hold them in an elevated position until said transferring mechanism is retracted.

8. In a container feeding device of the character described, in combination, a continuously driven supply conveyer adapted to support and convey a line of the containers in contiguous relation, an intermittently driven second conveyer for supporting and delivering containers transferred thereon from said supply conveyer, transferring mechanism adapted to transfer a plurality of containers from the supply conveyer to said second conveyer, said transfer mechanism being timed to be in its retracted position during the moving period of said intermittently driven second conveyer and being operative to transfer the containers during the idle period in the operation of said second conveyer, a star wheel arranged to engage successive containers being conveyed by said supply conveyer and to release a plurality thereof corresponding to the number to be transferred during each cycle of operation, means for delaying the advance of the containers thus released to the transferring mechanism until the latter has been moved to its retracted position, and means for registering the containers thus released in spaced relation with respect to said transferring mechanism.

9. In a container feeding device of the character described, in combination, a continuously driven supply conveyer adapted to support and convey a line of the containers in contiguous relation, an intermittently driven second conveyer for supporting and delivering containers transferred thereon from said supply conveyer, transferring mechanism adapted to transfer a plurality of containers from the supply conveyer to said second conveyer, said transfer mechanism being timed to be in its retracted position during the moving period of said intermittently driven second conveyer and being operative to transfer the containers during the idle period in the operation of said second conveyer, a star wheel arranged to engage successive containers being conveyed by said supply conveyer and to release a plurality thereof corresponding to the number to be transferred during each cycle of operation, means for delaying the advance of the containers thus released to the transferring mechanism until the latter has been moved to its retracted position, and means for registering the containers thus released in spaced relation in front of said transferring mechanism, said last named means including a fixed stop member for holding the first container released during each cycle in a predetermined position in front of said transferring mechanism and an escapement device arranged to permit passage of the first container and to be moved by such container into a position to stop a succeeding container in another predetermined position in front of said transferring mechanism.

10. In a container feeding device of the character described, in combination, a continuously driven supply conveyer adapted to support and convey a line of the containers in contiguous relation, an intermittently driven second conveyer for supporting and delivering containers transferred thereon from said supply conveyer, transferring mechanism adapted to transfer a plurality of containers from the supply conveyer to said second conveyer, said transfer mechanism being timed to be in its retracted position during the moving period of said intermittently driven second conveyer and being operative to transfer the containers during the idle period of operation of said second conveyer, and timing mechanism including a rotary member arranged to engage successive containers being conveyed by said supply conveyer and to release a plurality thereof during each cycle of operation, said member being continuously rotated at a uniform angular velocity and in timed relation to said transferring mechanism, and means for delaying the advance of the containers thus released to the transferring mechanism until the latter has been moved to its retracted position.

11. In a container feeding device of the character described, in combination, a continuously driven supply conveyer adapted to support and convey a line of the containers in contiguous relation, an intermittently driven second conveyer disposed in parallel relation to said supply conveyer for supporting and delivering containers transferred thereon from said supply conveyer, a transferring device adapted to transfer two containers in spaced relation from the supply conveyer to said second conveyer, a star wheel arranged to engage successive contiguous containers in the line and to release them in timed relation to the operation of said transferring device, said star wheel being continuously rotated at a uniform angular velocity so as to release two containers during each cycle of operation of the transferring mechanism, and means carried by said transferring device for separating said two containers and for disposing them in operative relation to said transferring device.

ARTHUR CLARENCE EVERETT.